United States Patent
Hsiung et al.

[11] Patent Number: 6,074,621
[45] Date of Patent: Jun. 13, 2000

[54] PURIFICATION OF GASES

[75] Inventors: Thomas Hsiao-Ling Hsiung, Emmaus; Alexander Schwarz, Bethlehem; Timothy Christopher Golden, Allentown, all of Pa.

[73] Assignee: Air Products and Chemicals, Inc., Allentown, Pa.

[21] Appl. No.: 09/206,185

[22] Filed: Dec. 4, 1998

[51] Int. Cl.$^7$ .............. C01B 31/18; C01B 3/00; C01B 17/16; C01B 31/20; C01B 5/02; C07C 1/02

[52] U.S. Cl. ............... 423/247; 423/220; 423/230; 423/248; 423/418.2; 423/437.1; 423/580.1; 252/373

[58] Field of Search ............... 423/220, 230, 423/418.2, 437.1, 580.1, 247, 248; 252/373

[56] References Cited

U.S. PATENT DOCUMENTS

| | | | |
|---|---|---|---|
| 3,672,824 | 6/1972 | Tamura et al. | 23/4 |
| 3,758,666 | 9/1973 | Frevel et al. | 423/247 |
| 4,019,879 | 4/1977 | Rabo et al. | 55/68 |
| 4,019,880 | 4/1977 | Rabo et al. | 55/68 |
| 4,579,723 | 4/1986 | Weltmer et al. | 423/219 |
| 4,713,224 | 12/1987 | Tamhankar et al. | 423/219 |
| 4,944,273 | 7/1990 | Baresel et al. | 123/440 |
| 5,110,569 | 5/1992 | Jain | 423/230 |

FOREIGN PATENT DOCUMENTS

| 2739304 | 9/1995 | France | B01D 53/75 |
|---|---|---|---|

OTHER PUBLICATIONS

Forster, et al., "Spectroscopic investigations on sorption and oxidation of carbon monoxide in transition metal ion–exchanged zeolites A: Studies on cobalt, nickel and copper forms" Zeolites, 1987, vol. 7, Nov 517–521, Anderson, H. C. and Green, W. J., Ind. Eng. Chem. 53, 645 (1961).

Primary Examiner—Steven P. Griffin
Assistant Examiner—Maribel Medina
Attorney, Agent, or Firm—Geoffrey L. Chase

[57] ABSTRACT

Carbon monoxide is removed from air prior to cryogenic separation of oxygen and nitrogen. Feed air is compressed and the heat of compression is used without further heating to drive catalytic oxidation of CO to $CO_2$ over a Pd and/or Pt on alumina catalyst followed by adsorption of water initially present and then either adsorption of hydrogen or oxidation of hydrogen to water and its removal by adsorption, along with carbon dioxide.

14 Claims, 2 Drawing Sheets

PURIFICATION OF GASES

BACKGROUND OF THE INVENTION

The present invention relates to the removal of carbon monoxide and hydrogen as well as carbon dioxide and water from air for the production of high purity nitrogen gas.

In many chemical processes, CO and $H_2$ are undesired species because of their chemical reactivity. For example, the electronics industry requires high purity $N_2$ (less than 5 ppb$_v$ CO and $H_2$) for the production of semiconductor materials. Impurities present in the $N_2$ during formation of the silicon wafers greatly increase chip failure rates. When air is subjected to cryogenic separation to produce $N_2$, since $N_2$ and CO have similar boiling points, CO present in the feed air to the cryogenic column will essentially end up in the product nitrogen. If no special provisions are taken to the distillation process, hydrogen enriches in the product $N_2$ to approximately two and a half times its concentration in the feed air. Therefore, the production of high purity $N_2$, i.e. CO and $H_2$-free $N_2$ for the electronics industry requires either 1) removal of CO and $H_2$ from ambient air prior to the distillation column or 2) post-treatment of the product $N_2$. Often times, electronics customers require both pre- and post-treatment for added system reliability.

The current techniques for trace CO and $H_2$ removal involve catalytic conversion of CO to $CO_2$ and $H_2$ to water with subsequent removal of $CO_2$ and water impurities (or mere hydrogen adsorption).

In the conventional process for cryogenic separation of air to recover $N_2$ and $O_2$, feed air is compressed, then cooled to low temperature before introduction to a two stage distillation column. Unless water and $CO_2$ are removed from the air before compression, these components will block heat exchangers employed for cooling the gas prior to distillation. The principal method for such removal is thermal swing adsorption (TSA) on molecular sieve. In the TSA system for $CO_2$ and water removal, atmospheric air is compressed to about 100 psig followed by water cooling and removal of the thus condensed water. Then the air, which is then about 100° F. (38° C.), can be further cooled to 40° F. (4.5° C.) using refrigerated ethylene glycol. The bulk of the water is removed in this step by condensation and separation of the condensate. The gas is then passed to a molecular sieve bed or mixed alumina/molecular sieve bed system where the remaining water and $CO_2$ are removed by adsorption. The sorbent beds are operated in a thermal swing mode with equal periods, such as four hours (maybe as long as 24 hours), being devoted to adsorption and to regeneration. By using two beds, one is operated for adsorption while the other is being regenerated and their roles are periodically reversed in the operating cycle. During the regeneration, part of the product gas ($N_2$) or waste stream from the cold box is slightly compressed with a blower and heated to about 260° C. The hot gas is passed through the bed being regenerated, perhaps for two hours, following which the regeneration gas is cooled to typically 4.5° C. for the final two hours, so cooling the bed to that temperature. Regeneration is carried out in a direction counter to that of the adsorption step.

Alternatively, a pressure swing adsorption (PSA) system may be used. In this case, cycle times are shorter (feed steps are 5–30 minutes), but feed temperature, pressure and regeneration gas remains the same. In the case of PSA, the regeneration gas is not heated.

Such a system is effective for the removal of $CO_2$, water and $C_{3+}$ hydrocarbons from atmospheric air. However, conventional molecular sieve beds are not effective for the removal of CO or $H_2$ The main conventional technique currently used to produce CO-free $N_2$ includes oxidation of CO present in the ambient air to $CO_2$ prior to feeding to the molecular sieve system. This additional catalytic conversion system adds to capital and operating costs of a standard $N_2$ plant. Alternatively, such CO removal steps may be applied to the nitrogen obtained after the air separation process.

In one known method CO is removed from nitrogen using a Ni on alumina catalyst. The principle disadvantages with this material are high cost, the need for activation in reducing gas and the pyrophoric nature of the activated material. Good adsorbents for trace CO removal should preferably be less expensive, easily regenerable and not pyrophoric.

The oxidation of CO to $CO_2$ and $H_2$ to $H_2O$ in the presence of $O_2$ occurs readily at high temperatures (above 500° C.). These reactions can be carried out at lower temperature, about 150° C., in the presence of noble metal catalysts based on palladium or platinum (Anderson, H. C. and Green, W. J., Ind. Eng. Chem., 53, 645, 1961). This technique is currently used as a pre-treatment step for ambient air prior to the front-end adsorption system for $CO_2$ and water removal on a cryogenic air plant. The main disadvantages of this removal technique include 1) the need to heat the air prior introduction to the catalyst bed, 2) an extra heat exchanger and an extra booster heater are required that result in increased plot space, and 3) the added system pressure drop and heat duty increase the power requirements of the system.

Ambient temperature processes for the removal of trace impurities from inert gases are also known in the art. U.S. Pat. No. 4,579,723 discloses passing an inert gas stream through a catalyst bed containing a mixture of chromium and platinum on gamma alumina followed by a second bed composed of gamma alumina coated with a mixture of several metals. These beds both convert CO to $CO_2$ and $H_2$ to water and adsorb the resulting impurities to form a high purity product (less than 1 ppm).

U.S. Pat. No. 4,713,224 teaches a one step process for the purifying gases containing trace quantities of CO, $CO_2$, $O_2$, $H_2$ and $H_2O$ in which the gas stream is passed over a material comprising elemental nickel and having a large surface area. If there is oxygen present, CO is oxidised to $CO_2$, otherwise it is adsorbed. The specification is rather vague as regards the nature of the substrate on which the nickel is supported, referring to it merely as a 'silica-based substrate'.

Processes for the ambient temperature oxidation of CO to $CO_2$ are given in U.S. Pat. Nos. 3,672,824 and 3,758,666.

U.S. Pat. No. 5,110,569 teaches a process for removing CO, $CO_2$, $H_2O$ and optionally $H_2$ from a feed stream (particularly air) comprising 1) initially removing water and carbon dioxide, 2) catalytic oxidation of CO to $CO_2$ and $H_2$ to $H_2O$ and 3) removing the oxidation products. The resulting gas stream may then be purified by cryogenic distillation.

It is suggested in U.S. Pat. No. 4,944,273 that CO can be selectively adsorbed by zeolites doped with metals such as Ca, Co, Ni, Fe, Cu, Ag, Pt, or Ru. Based on this property, it is proposed there to use such doped zeolites in CO sensors, e.g. for use in sensors monitoring automobile exhaust gas systems. However, no demonstration of selectivity is shown in that specification. Also, the highest capacity for adsorbing CO demonstrated is in connection with the Na form of zeolite ZSM 8 and no CO adsorption is shown when the Co form of ZSM 5 or the Ru form of ZSM 8 are tested. Since the units in which adsorption was measured appear to be mis-stated, it is impossible to tell what adsorption capacity in absolute terms these adsorbents were found to have. However, for the purposes of U.S. Pat. No. 4,944,273 it would appear to be the change in electrical properties on exposure to CO that the zeolite exhibits that is important rather than adsorption capacity.

U.S. Pat. No. 4,019,879 discloses the use of a zeolite containing $Cu^+$ ions for adsorbing CO selectively. However, the CO is recovered for use as a reagent from gas streams containing large concentrations of it and there is no indication that such an adsorbent would be effective to remove ppm levels of CO from a gas stream.

U.S. Pat. No. 4,019,880 describes the adsorption of CO on zeolites containing silver cations. The CO concentration can be reduced below as little as 10 ppm CO.

Forster et al, 'Spectroscopic investigations on sorption and oxidation of carbon monoxide in transition metal ion-exchanged zeolites A: Studies on cobalt, nickel and copper forms' Zeolites, 1987, Vol. 7, Nov 517–521, discusses the adsorption of CO on the zeolites referred to in its title. Capacity for adsorption at low ppm levels is not discussed.

U.S. Pat. No. 5,110,569 teaches a process for removing trace quantities of carbon monoxide and hydrogen from an air stream along with larger quantities of carbon dioxide and water as a prelude to cryogenic distillation. The process is conducted by TSA or PSA using a three layer adsorption bed having a first layer for adsorbing water (suitably alumina, silica gel, zeolite or combinations thereof), a second layer of catalyst for converting carbon monoxide to carbon dioxide (suitably nickel oxide or a mixture of manganese and copper oxides) and a third layer for adsorbing carbon dioxide and water (suitably zeolite, activated alumina or silica gel). The second layer may include a catalyst for converting hydrogen to water and this may be supported palladium.

It is not disclosed that any catalyst is capable of both oxidising carbon monoxide to carbon dioxide and adsorbing the carbon dioxide produced. Nor is it disclosed that supported palladium can be used to convert carbon monoxide to carbon dioxide. Equally, it is not disclosed that the supported palladium used for oxidising hydrogen is capable of adsorbing the water produced.

It is also not apparently the intention that the carbon dioxide present initially should be adsorbed prior to the oxidation of the carbon monoxide.

In FR 2739304, carbon monoxide is first oxidised to carbon dioxide and the carbon dioxide produced together with carbon dioxide and water present initially are then adsorbed using conventional adsorbents. Thereafter, hydrogen is adsorbed on palladium supported on alumina. Metals that can be used in place of palladium are Os, Ir, Rh, Ru, and Pt. It is stated that hydrogen is not oxidised under these conditions. This casts doubt on whether U.S. Pat. No. 5,110,569 is correct in stating that hydrogen can be oxidised on supported palladium or other precious metals.

BRIEF SUMMARY OF THE INVENTION

The present invention now provides a process for the removal of carbon monoxide, hydrogen, carbon dioxide and water from a feed gas containing oxygen, comprising compressing the feed gas and thereby heating the feed gas by heat of compression, contacting the heated feed gas with a catalyst to oxidise the carbon monoxide to carbon dioxide (and partially converting hydrogen to water) using said heat of compression and so forming a carbon monoxide depleted gas stream, contacting the carbon monoxide depleted gas stream with a solid adsorbent to remove at least water therefrom to produce a carbon monoxide and water depleted gas stream, and contacting the carbon monoxide and water depleted gas stream with a catalyst to oxidise the remaining hydrogen to water and an adsorbent to adsorb the resulting water and any carbon dioxide.

Alternatively, the present invention is a process for the removal of carbon monoxide, hydrogen, carbon dioxide and water from a feed gas, comprising compressing the feed gas and thereby heating the feed gas by heat of compression, contacting the heated feed gas with a catalyst to oxidise the carbon monoxide to carbon dioxide using said heat of compression and so forming a carbon monoxide depleted gas stream, contacting the carbon monoxide depleted gas stream with a solid adsorbent to remove water and less than all said carbon dioxide therefrom to produce a carbon monoxide and water depleted-carbon dioxide containing gas stream, and contacting the carbon monoxide and water depleted-carbon dioxide containing gas stream with an adsorbent for hydrogen and an adsorbent for carbon dioxide.

Further alternatively, the present invention is a process for the removal of carbon monoxide, hydrogen, carbon dioxide and water from a feed gas, comprising compressing the feed gas and thereby heating the feed gas by heat of compression, contacting the heated feed gas with a catalyst to oxidise the carbon monoxide to carbon dioxide using said heat of compression and so forming a carbon monoxide depleted gas stream, contacting the carbon monoxide depleted gas stream with a physical mixture of a solid adsorbent to remove water, an adsorbent for hydrogen and an adsorbent for carbon dioxide.

For each of the alternatives above, no heat, or substantially no heat is added to the feed gas following the compression and prior to the catalytic conversion of carbon monoxide to carbon dioxide. Accordingly, the need for the economiser and the booster heater used conventionally is avoided. As a result, the process becomes more energy efficient due to lower pressure drop and lower heat requirements.

In contrast to the teaching of FR-A-2739304, in the present invention, the hydrogen is partially but significantly removed in the catalyst bed that removes carbon monoxide, and the remaining hydrogen is then oxidised to water and an adsorbent is provided for the water so produced or alternatively the hydrogen is adsorptively removed from a gas stream still containing carbon dioxide.

Water is not wholly removed prior to the catalytic oxidation of carbon monoxide. For the conversion of carbon monoxide to carbon dioxide using Hopcalite as catalyst as suggested in U.S. Pat. No. 5,110,569 there must be a dry feed. The presence of even traces of water can deactivate the catalyst and cause it to become ineffective. Also, the layer used to remove hydrogen in U.S. Pat. No. 5,110,569 follows immediately after the CO oxidation layer. Any unconverted CO and $CO_2$ produced in the second layer may adversely affect the conversion of hydrogen due to competitive adsorption on the catalytic surface.

Preferably, said catalyst for oxidation of carbon monoxide to carbon dioxide is Pt and Pd impregnated alumina which unexpectedly oxidises part of the hydrogen to water as well as CO to $CO_2$ in an air stream containing significant amounts of water.

The catalyst for the oxidation of carbon monoxide is preferably contained in a separate vessel from the solid adsorbent for the removal of carbon dioxide.

The catalyst for the oxidation of carbon monoxide to carbon dioxide optionally also partially catalytically oxidises hydrogen to water.

The adsorbent for the adsorption of carbon dioxide and water is preferably activated alumina, impregnated aluminas and zeolites.

The solid adsorbent for adsorption of water may be a zeolite, alumina, impregnated aluminas or silica gel.

The catalyst for the oxidation of hydrogen to water is suitably Pd on alumina or Pt on alumina.

The catalyst for oxidation of hydrogen to water and the adsorbent for water may be mixed together, optionally with the adsorbent for carbon dioxide.

The same material may serve for adsorbing carbon dioxide and water.

Said adsorbent for carbon dioxide and adsorbent for water may be periodically regenerated, suitably by PSA or TSA or any variant thereof.

The feed gas may be air for purification prior to a cryogenic air separation process to produce high purity nitrogen.

BRIEF DESCRIPTION OF SEVERAL VIEWS OF THE DRAWINGS

The invention will be further described and illustrated with reference to the accompanying drawings, in which.

DETAILED DESCRIPTION OF THE INVENTION

Figure 1:
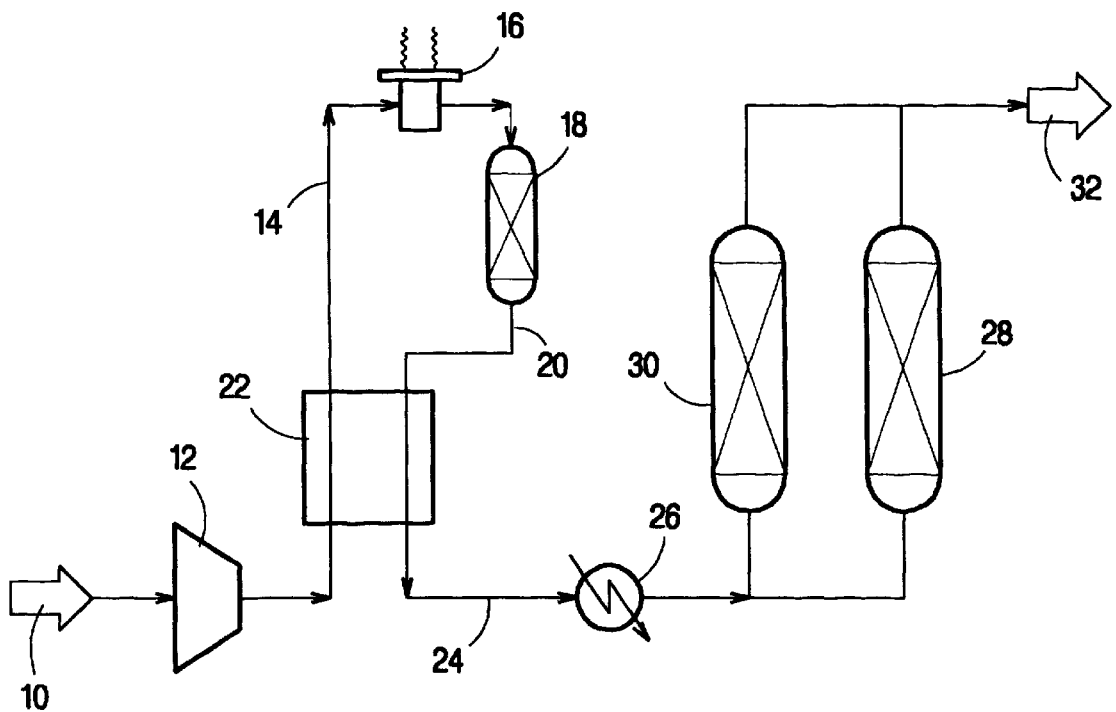
FIG. 1 schematically illustrates a known purification apparatus for purifying air for cryogenic separation.

As seen in FIG. 1, air is supplied to an inlet 10 of a main air compressor (MAC) 12 where it is compressed and heated by heat of compression before being fed along a line 14 to a booster heater 16 to raise its temperature to a level suitable for feeding to a column 18 containing a supported palladium/platinum bimetallic catalyst which oxidises carbon monoxide in the air to carbon dioxide. Other potential catalyst include: iron, cobalt, nickel, ruthenium, rhodium, osmium, iridium. The air is then fed via a line 20 to an economiser heat exchanger 22 in which heat is abstracted from the carbon monoxide depleted gas stream and supplied to the gas stream in the line 14. The carbon monoxide depleted gas stream is then fed via a line 24 to a cooler 26 before being introduced into one of two similar columns 28, 30 for TSA or PSA adsorption of carbon dioxide and water. The air in its purified state then is supplied via an outlet 32 to a cryogenic air separation process.

Figure 2:
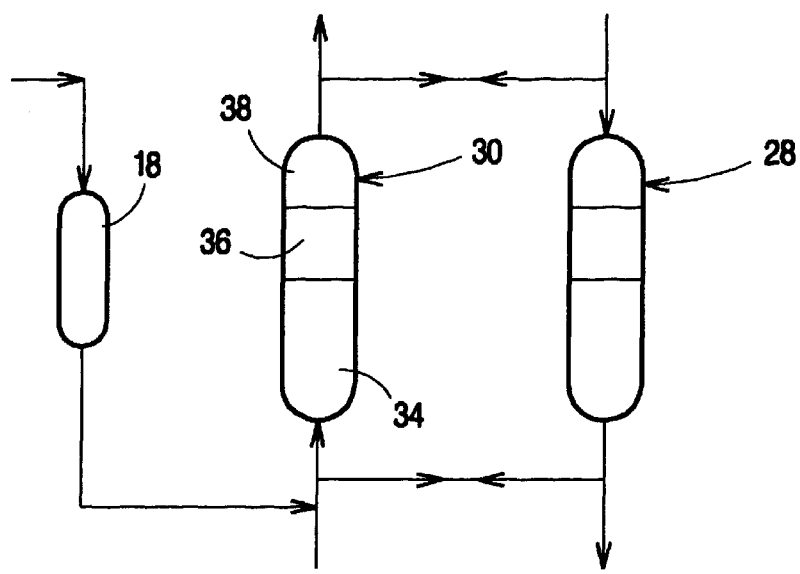
FIG. 2 schematically illustrates a first embodiment according to the present invention.

As seen in FIG. 2, according to a first embodiment of the invention, air is supplied to a main air compressor (not shown) in a similar manner to that illustrated in FIG. 1 but is supplied directly from the main air compressor to the column 18 containing a suitable carbon monoxide oxidation catalyst. The catalyst converts essentially all carbon monoxide to carbon dioxide and at the same time converts a portion of any hydrogen to water. As there is no booster heater or economiser provided, the oxidation takes place relying upon the heat of compression produced by the main air compressor. The carbon monoxide depleted gas stream produced by this process is then fed to a similar TSA or PSA adsorption system as shown in FIG. 1. In the embodiment illustrated in FIG. 2, each of the columns 28, 30 contains three layers of material. The first of these is a layer of activated alumina adsorbent 34 for adsorbing water. The second is a layer of material 36 for hydrogen removal which can be either oxidation catalyst [Pd and/or Pt on alumina] that converts remaining hydrogen to water or a layer of hydrogen adsorbent that removes the hydrogen by adsorption, and the third layer is a layer 38 of zeolite 13X adsorbent for adsorbing water produced by the oxidation of hydrogen, as well as any residual carbon dioxide.

Figure 3:
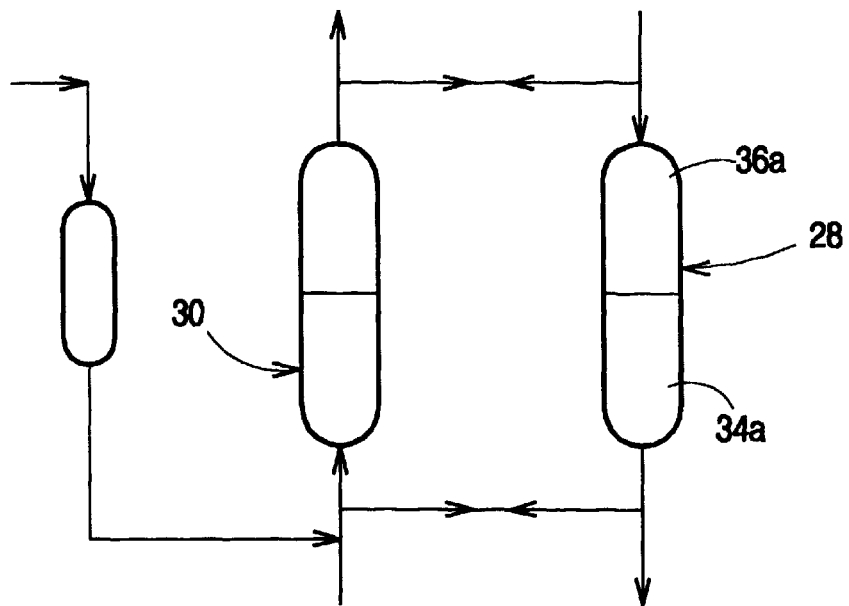
FIG. 3 schematically illustrates a second embodiment according to the present invention.

In the second form of apparatus according to the invention shown in FIG. 3, the apparatus is similar except that the columns 28, 30 contain only two layers of material. The first is a layer 34a of activated alumina for water removal as in FIG. 2. The second layer 36a consists of a mixture of zeolite 13X carbon dioxide/water adsorbent and the hydrogen oxidation catalyst so that water produced by the oxidation of hydrogen is adsorbed in the same layer in which it is produced.

Figure 4:
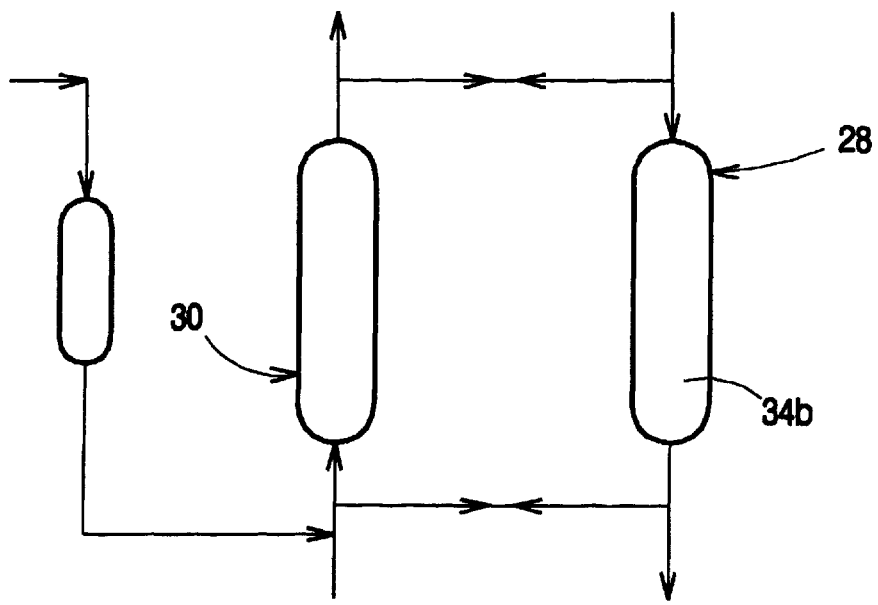
FIG. 4 schematically illustrates a third embodiment according to the present invention.

In the variant illustrated in FIG. 4, a single combined adsorption/catalyst layer 34b is provided in each of the columns 28, 30. This material contains a mixture of adsorbent for carbon dioxide and water with hydrogen oxidation catalyst. Water is adsorbed onto activated alumina, molecular sieve zeolite or similar material creating a slow moving equilibrium adsorption front. Hydrogen passes through this front and reacts with oxygen over the catalyst. The residual water is adsorbed onto the catalyst's support and the water adsorbent bed creating another water equilibrium adsorption front slowly moving ahead of the first one.

EXAMPLES

The invention will be illustrated by the following specific example:

Example 1

A total weight of 959 grams of a commercial precious metals based oxidation catalyst [0.1 wt % Pd and 0.2 wt % Pt on alumina] was loaded into a reactor. The reactor was then challenged with air containing approximately 5 ppm carbon monoxide and 5 ppm hydrogen as well as 2% water. The air feed rate was 4 SCFM ($0.1$ m$^3$/min$^{-1}$). The reactor was operated at a pressure of 110 psig (758 kPa) and at a temperature of 200° F. (93° C.). These operating conditions were typical for compressed air coming from the main air compressor in an air separation plant. The carbon monoxide and hydrogen concentration in the product stream was measured to be less than 0.01 ppm and 1.75 ppm respectively by gas chromatograph.

The present invention has been set forth with regard to several preferred embodiments, but the scope of the present invention should be ascertained from the claims which follow.

What is claimed is:

1. A process for the removal of carbon monoxide, hydrogen, carbon dioxide and water from a feed gas, comprising compressing the feed gas and thereby heating the feed gas by heat of compression, contacting the heated feed gas with a catalyst to oxidise the carbon monoxide to carbon dioxide using said heat of compression and so forming a carbon monoxide depleted gas stream, contacting the carbon monoxide depleted gas stream with a solid adsorbent to remove at least water therefrom to produce a carbon monoxide and water depleted gas stream, and contacting the carbon monoxide and water depleted gas stream with a catalyst to oxidise hydrogen to water and an adsorbent to adsorb water and carbon dioxide.

2. A process as claimed in claim 1, wherein said catalyst for oxidation of carbon monoxide to carbon dioxide is selected from the group consisting of iron, cobalt, nickel, ruthenium, rhodium, osmium, iridium, platinum, palladium and mixtures thereof all supported on a catalyst support.

3. A process as claimed in claim 1, wherein the catalyst for the oxidation of carbon monoxide is contained in a separate vessel from the solid adsorbent for the removal of water.

4. A process as claimed in claim 1, wherein the catalyst for the oxidation of carbon monoxide to carbon dioxide also catalytically oxidises at least some hydrogen to water.

5. A process as claimed in claim 1, wherein the adsorbent for the adsorption of carbon dioxide and water is activated alumina, impregnated alumina or zeolite.

6. A process as claimed in claim 1, wherein the solid adsorbent for adsorption of water is a zeolite, alumina, impregnated alumina or silica gel.

7. A process as claimed in claim 1, wherein the catalyst for the oxidation of hydrogen to water is selected from the group consisting of platinum, palladium or mixtures thereof, all supported on alumina.

8. A process as claimed in claim 1, wherein the catalyst for oxidation of hydrogen to water and the adsorbent for water and carbon dioxide are mixed together.

9. A process as claimed in claim 1, wherein said solid adsorbent adsorbs water and at least some carbon dioxide.

10. A process as claimed in claim 1, wherein said solid adsorbent to remove water and said adsorbent to adsorb water and carbon dioxide are periodically regenerated.

11. A process as claimed in claim 10, wherein said regeneration is selected from the group consisting of PSA and TSA.

12. A process as claimed in claim 1, wherein said feed gas is air for purification prior to a cryogenic air separation process to produce high purity nitrogen.

13. A process for the removal of carbon monoxide, hydrogen, carbon dioxide and water from a feed gas, comprising compressing the feed gas and thereby heating the feed gas by heat of compression, contacting the heated feed gas with a catalyst to oxidise the carbon monoxide to carbon dioxide using said heat of compression and so forming a carbon monoxide depleted gas stream, contacting the carbon monoxide depleted gas stream with a solid adsorbent to remove water and less than all said carbon dioxide therefrom to produce a carbon monoxide and water depleted-carbon dioxide containing gas stream, and contacting the carbon monoxide and water depleted-carbon dioxide containing gas stream with an adsorbent for hydrogen and an adsorbent for carbon dioxide.

14. A process for the removal of carbon monoxide, hydrogen, carbon dioxide and water from a feed gas, comprising compressing the feed gas and thereby heating the feed gas by heat of compression, contacting the heated feed gas with a catalyst to oxidise the carbon monoxide to carbon dioxide using said heat of compression and so forming a carbon monoxide depleted gas stream, contacting the carbon monoxide depleted gas stream with a mixture of a solid adsorbent to remove water, an adsorbent for hydrogen and an adsorbent for carbon dioxide.

* * * * *